(12) United States Patent
Murayama et al.

(10) Patent No.: US 10,723,332 B2
(45) Date of Patent: Jul. 28, 2020

(54) BRAKING DEVICE FOR VEHICLE AND VEHICLE INCLUDING BRAKING DEVICE

(71) Applicant: TOYOTA JIDOSHA KABUSHIKI KAISHA, Toyota-shi, Aichi-ken (JP)

(72) Inventors: Yasushi Murayama, Nagakute (JP); Yusuke Ennoji, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/925,145

(22) Filed: Mar. 19, 2018

(65) Prior Publication Data
US 2018/0273006 A1    Sep. 27, 2018

(30) Foreign Application Priority Data

Mar. 23, 2017    (JP) .................. 2017-057960

(51) Int. Cl.
*B60T 8/1755*    (2006.01)
*F16D 65/18*    (2006.01)
(Continued)

(52) U.S. Cl.
CPC ...... *B60T 8/17551* (2013.01); *B60G 17/0164* (2013.01); *B60T 8/246* (2013.01);
(Continued)

(58) Field of Classification Search
CPC .. B60T 8/1755; B60T 8/246; B60T 2270/313; B60T 8/17551; B60T 2250/03; B60T 8/3255; B60T 2250/04; B60T 2260/024; B60T 2270/406; B60T 2270/608; B60T 8/92; B60W 2520/14; B60W 30/02;
(Continued)

(56) References Cited

U.S. PATENT DOCUMENTS 5,701,248 A * 12/1997 Wanke .................. B60T 8/1755
303/146
5,711,024 A * 1/1998 Wanke .................. B60T 8/1755
180/197

(Continued)

FOREIGN PATENT DOCUMENTS

CN    101462539 A    6/2009
CN    105939905 A    9/2016
(Continued)

*Primary Examiner* — Bradley T King
*Assistant Examiner* — Mahbubur Rashid
(74) *Attorney, Agent, or Firm* — Sughrue Mion, PLLC (57) ABSTRACT

A braking device for a vehicle includes a plurality of braking force generators; a steering assist device; a yaw rate detecting unit; and a control device. The control device is configured to perform control such that, in a case where the plurality of braking force generators perform a braking operation and there is a malfunctioning braking force generator, braking forces of the plurality of braking force generators other than the malfunctioning braking force generator are maintained or increased when an acquired value of an actual yaw rate acquired from the yaw rate detecting unit is equal to or less than a reference value, and a steering torque is applied to a steering system in a direction in which the actual yaw rate decreases when the acquired value of the actual yaw rate is larger than the reference value.

6 Claims, 8 Drawing Sheets

(51) Int. Cl.
  *B60G 17/016* (2006.01)
  *B60T 8/24* (2006.01)
  *B60T 8/92* (2006.01)
  *B60T 13/74* (2006.01)
  *F16D 121/24* (2012.01)
  *B60T 8/32* (2006.01)

(52) U.S. Cl.
  CPC .............. *B60T 8/92* (2013.01); *B60T 13/741* (2013.01); *F16D 65/183* (2013.01); *B60G 2400/1042* (2013.01); *B60T 8/3255* (2013.01); *B60T 2270/402* (2013.01); *B60T 2270/406* (2013.01); *B60W 2520/14* (2013.01); *F16D 2121/24* (2013.01)

(58) Field of Classification Search
  CPC ......... B60W 10/184; B60W 2520/125; B60W 2720/14; B60W 2720/30; B60W 2520/20; B60W 40/064; B60W 10/08; B60W 10/18; B60W 30/18127; B60W 10/20; B60W 40/114; B60W 2510/20; B60W 2710/20; B60W 2720/20; B60W 2720/403; B60G 17/0182; B60G 2600/08; B60G 2800/215; B60G 2800/922; B60R 16/0233; F16D 2127/06
  See application file for complete search history.

(56) References Cited

U.S. PATENT DOCUMENTS

| | | | | |
|---|---|---|---|---|
| 5,915,800 | A * | 6/1999 | Hiwatashi | B60T 8/1755 303/146 |
| 6,089,680 | A * | 7/2000 | Yoshioka | B60T 8/1755 303/146 |
| 6,132,014 | A * | 10/2000 | Kiso | B60T 8/1755 303/140 |
| 6,144,904 | A * | 11/2000 | Tseng | B60T 8/171 180/170 |
| 6,161,905 | A * | 12/2000 | Hac | B60T 8/17551 303/139 |
| 6,205,391 | B1 * | 3/2001 | Ghoneim | B60T 8/1755 180/167 |
| 6,412,885 | B1 | 7/2002 | Shirai et al. | |
| 6,648,426 | B1 * | 11/2003 | Boettiger | B60T 8/1755 303/146 |
| 6,923,510 | B2 * | 8/2005 | Hac | B60T 8/1755 303/122 |
| 7,970,512 | B2 * | 6/2011 | Lu | B60T 8/171 701/41 |
| 8,200,391 | B2 * | 6/2012 | Sakugawa | B60T 8/1755 180/6.2 |
| 8,764,124 | B2 * | 7/2014 | Furuyama | B60T 8/1766 303/146 |
| 2004/0080209 | A1 * | 4/2004 | Leimbach | B60T 8/1708 303/146 |
| 2004/0099469 | A1 * | 5/2004 | Koibuchi | B60T 8/175 180/421 |
| 2004/0186647 | A1 * | 9/2004 | Ono | B60T 8/1755 701/70 |
| 2004/0201272 | A1 * | 10/2004 | O'Dea | B60T 8/1755 303/146 |
| 2005/0023895 | A1 * | 2/2005 | Yasutake | B60T 8/1755 303/146 |
| 2006/0015231 | A1 * | 1/2006 | Yoshimura | B60L 3/0023 701/48 |
| 2006/0158031 | A1 * | 7/2006 | Kummel | B60T 8/17554 303/146 |
| 2008/0054718 | A1 * | 3/2008 | Nishino | B60T 8/1755 303/146 |
| 2009/0051216 | A1 * | 2/2009 | Maeda | B60L 15/2036 303/146 |
| 2009/0164068 | A1 | 6/2009 | Tamai | |
| 2011/0231052 | A1 * | 9/2011 | Ellis | B60T 7/12 701/31.4 |
| 2012/0109465 | A1 * | 5/2012 | Svensson | B60T 8/1708 701/42 |
| 2012/0283907 | A1 * | 11/2012 | Lee | B60T 8/17557 701/31.9 |
| 2013/0253770 | A1 * | 9/2013 | Nishikawa | B62D 6/003 701/42 |
| 2013/0253793 | A1 * | 9/2013 | Lee | B60W 50/029 701/70 |
| 2015/0094911 | A1 * | 4/2015 | Munnix | B62D 15/024 701/41 |
| 2015/0291210 | A1 * | 10/2015 | Kageyama | B60T 8/1755 701/41 |
| 2016/0132055 | A1 * | 5/2016 | Matsuno | B60W 10/184 701/23 |
| 2016/0185328 | A1 * | 6/2016 | Hattori | B60T 8/17558 701/70 |
| 2016/0297478 | A1 * | 10/2016 | Inoue | B60T 8/246 |
| 2017/0137023 | A1 * | 5/2017 | Anderson | B60G 17/0195 |
| 2017/0174194 | A1 | 6/2017 | Baumgaertner et al. | |

FOREIGN PATENT DOCUMENTS

| | | |
|---|---|---|
| JP | 11-078859 A | 3/1999 |
| JP | 2006131064 A | 5/2006 |
| JP | 2008056074 A | 3/2008 |
| JP | 2009149198 A | 7/2009 |
| JP | 2017504526 A | 2/2017 |

* cited by examiner

RELATED ART

FIG. 7

RELATED ART

FIG. 8

BRAKING DEVICE FOR VEHICLE AND VEHICLE INCLUDING BRAKING DEVICE

INCORPORATION BY REFERENCE

The disclosure of Japanese Patent Application No. 2017-057960 filed on Mar. 23, 2017 including the specification, drawings and abstract is incorporated herein by reference in its entirety.

BACKGROUND

1. Technical Field

The disclosure relates to a braking device for a vehicle, and a vehicle including a braking device.

2. Description of Related Art

A braking mechanism is provided in a vehicle such as an automobile to correspond to each vehicle wheel. The braking mechanism is configured such that an actuator is driven in accordance with an operation of a brake pedal to generate a braking force. For example, Japanese Unexamined Patent Application Publication No. 11-78859 (JP 11-78859 A) describes braking units for a vehicle, which are respectively provided for vehicle wheels and are controlled mutually independently. The braking units operate such that when a braking unit for one vehicle wheel is malfunctioning, the operation of a braking unit for a vehicle wheel on a side opposite to the one vehicle wheel in a right-left direction is prohibited and braking forces are generated using braking units for right and left vehicle wheels on a side opposite to the one vehicle wheel in a front-rear direction.

SUMMARY

The inventors obtained the following findings regarding a braking device for a vehicle. In a vehicle such as an automobile, braking units that are independently controlled to correspond to four vehicle wheels may be provided. In the vehicle, in the case where a braking unit for one vehicle wheel (for example, a front-right wheel) is malfunctioning, yaw rotation of the vehicle may be caused and the vehicle may be unable to stop appropriately, when a braking operation is performed by driving the braking units for the three other vehicle wheels. Further, it is considered that in the case where a yaw rate of the vehicle is large, the yaw rate may become excessively large and the vehicle may be unable to be controlled when the three vehicle wheels are braked.

In order to suppress the yaw rotation due to braking of the three vehicle wheels, it is conceivable to perform control to prohibit braking of the vehicle wheel (for example, the rear-left wheel) which is located on an opposite side of the center of the vehicle from the malfunctioning braking unit. However, in this configuration, two vehicle wheels among four vehicle wheels are not braked. It is considered that when two vehicle wheels are not braked, the braking force for the entire vehicle may decrease and a braking distance may increase. Accordingly, the inventors recognized that a braking device for a vehicle needs to be improved so as to suppress yaw rotation of a vehicle and to increase a braking force.

The disclosure provides a braking device for a vehicle, which makes it possible to suppress yaw rotation and to increase a braking force. The disclosure also provides a vehicle including a braking device that makes it possible to suppress yaw rotation and to increase a braking force.

A first aspect of the disclosure relates to a braking device for a vehicle. The braking device includes a plurality of braking force generators provided to respectively correspond to vehicle wheels of the vehicle, and configured to be controlled mutually independently and to generate braking forces based on an amount of depression of a brake pedal; a steering assist device configured to apply a steering torque to a steering system of the vehicle; a yaw rate detecting unit configured to detect an actual yaw rate of the vehicle; and a control device configured to control the steering assist device and the plurality of braking force generators. The control device is configured to perform control such that, in a case where the plurality of braking force generators perform a braking operation and there is a malfunctioning braking force generator that does not generate the braking force among the plurality of braking force generators, the braking forces of the plurality of braking force generators other than the malfunctioning braking force generator are maintained or increased when an acquired value of the actual yaw rate acquired from the yaw rate detecting unit is equal to or less than a reference value, and the steering torque is applied to the steering system in a direction in which the actual yaw rate decreases when the acquired value of the actual yaw rate is larger than the reference value.

According to the aspect, when there is a malfunctioning braking force generator, the braking forces can be increased or maintained, or the steering torque can be applied to the steering system of the vehicle, based on the actual yaw rate of the vehicle.

According to the aspect of the disclosure, it is possible to provide the braking device for a vehicle, which makes it possible to suppress yaw rotation and to increase a braking force.

A second aspect of the disclosure relates to a vehicle including a braking device. The braking device includes a plurality of braking force generators provided to respectively correspond to vehicle wheels of the vehicle, and configured to be controlled mutually independently and to generate braking forces based on an amount of depression of a brake pedal; a steering assist device configured to apply a steering torque to a steering system of the vehicle; a yaw rate detecting unit configured to detect an actual yaw rate of the vehicle; and a control device configured to control the steering assist device and the plurality of braking force generators. The control device is configured to perform control such that, in a case where the plurality of braking force generators perform a braking operation and there is a malfunctioning braking force generator that does not generate the braking force among the plurality of braking force generators, the braking forces of the plurality of braking force generators other than the malfunctioning braking force generator are maintained or increased when an acquired value of the actual yaw rate acquired from the yaw rate detecting unit is equal to or less than a reference value, and the steering torque is applied to the steering system in a direction in which the actual yaw rate decreases when the acquired value of the actual yaw rate is larger than the reference value.

According to the aspect of the disclosure, it is possible to provide the vehicle including the braking device that makes it possible to suppress yaw rotation and to increase a braking force.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The inventors studied a braking device that includes braking force generators that are controlled mutually independently to correspond to four vehicle wheels of a vehicle in order to improve braking characteristics of the vehicle, and the inventors obtained the following findings.

Figure 5:
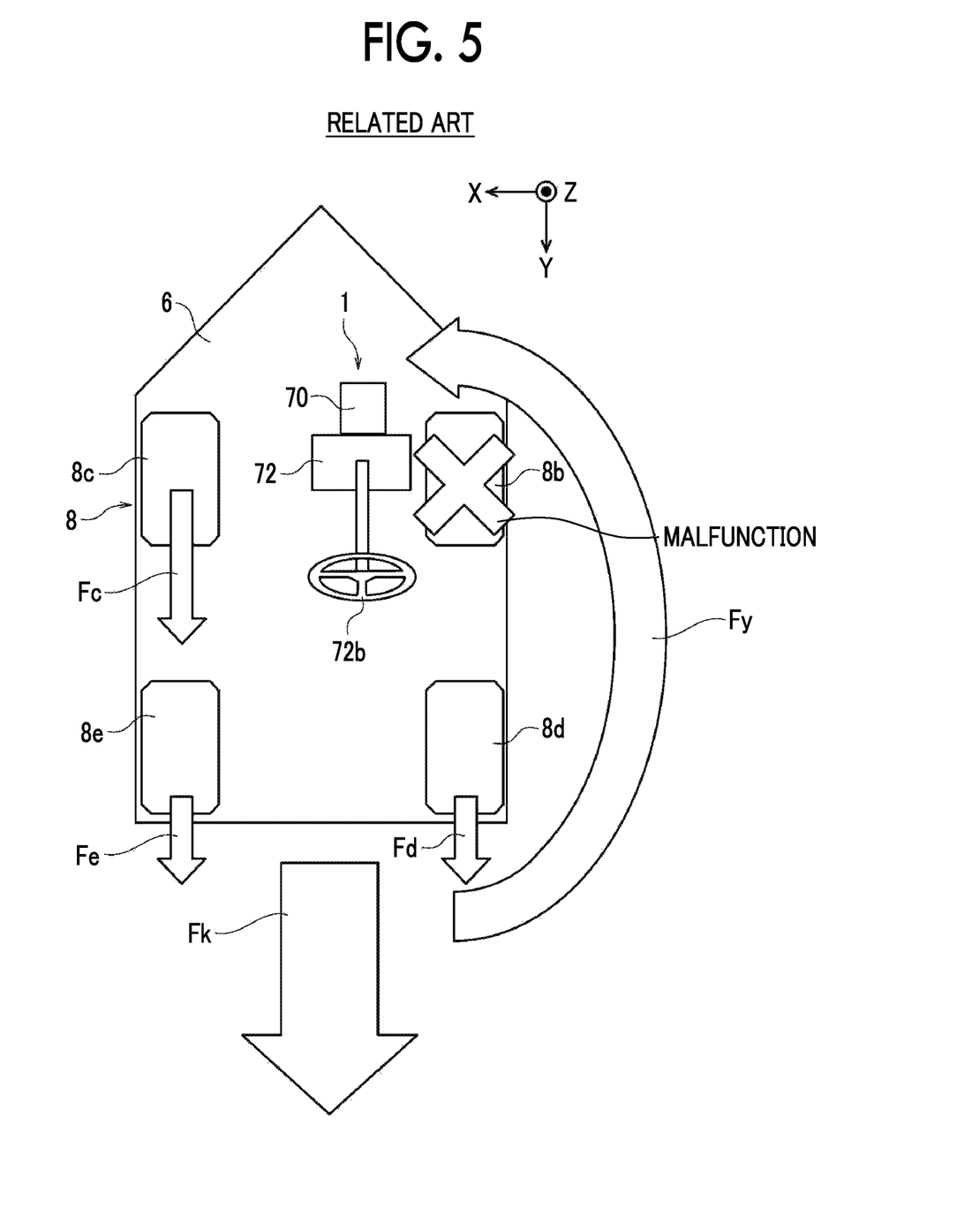
FIG. 5 is a diagram conceptually illustrating braking behavior of a vehicle including a braking device according to a first comparative example.

FIG. 5 is a diagram conceptually illustrating braking behavior of a vehicle including a braking device 1 according to a first comparative example. For example, the braking device 1 according to the first comparative example is configured such that when a braking force generator for a front-right wheel 8b is malfunctioning, no special control is performed and a braking operation continues to be performed using braking force generators for three other vehicle wheels 8c, 8d, and 8e. In the vehicle including the braking device 1 according to the first comparative example, a large yawing moment Fy may act at the time of braking depending on conditions regarding a speed and a steering angle. In the example illustrated in FIG. 5, the yawing moment Fy acts in a counterclockwise direction in a plan view around a Z axis of a vehicle 6. It is considered that when a large yawing moment Fy acts, counterclockwise yaw rotation of the vehicle 6 may be caused. When the yaw rate of the vehicle is excessively large, there is a possibility that the vehicle may be unable to be controlled. The sizes of arrows which are directed downward indicate magnitudes of braking forces Fc, Fd, and Fe for the vehicle wheels and a braking force Fk for the vehicle 6. In the braking device 1, since three vehicle wheels are braked, the braking force Fk for the vehicle 6 is less than that when four vehicle wheels are braked. When the braking force Fk decreases, a braking distance increases.

Figure 6:
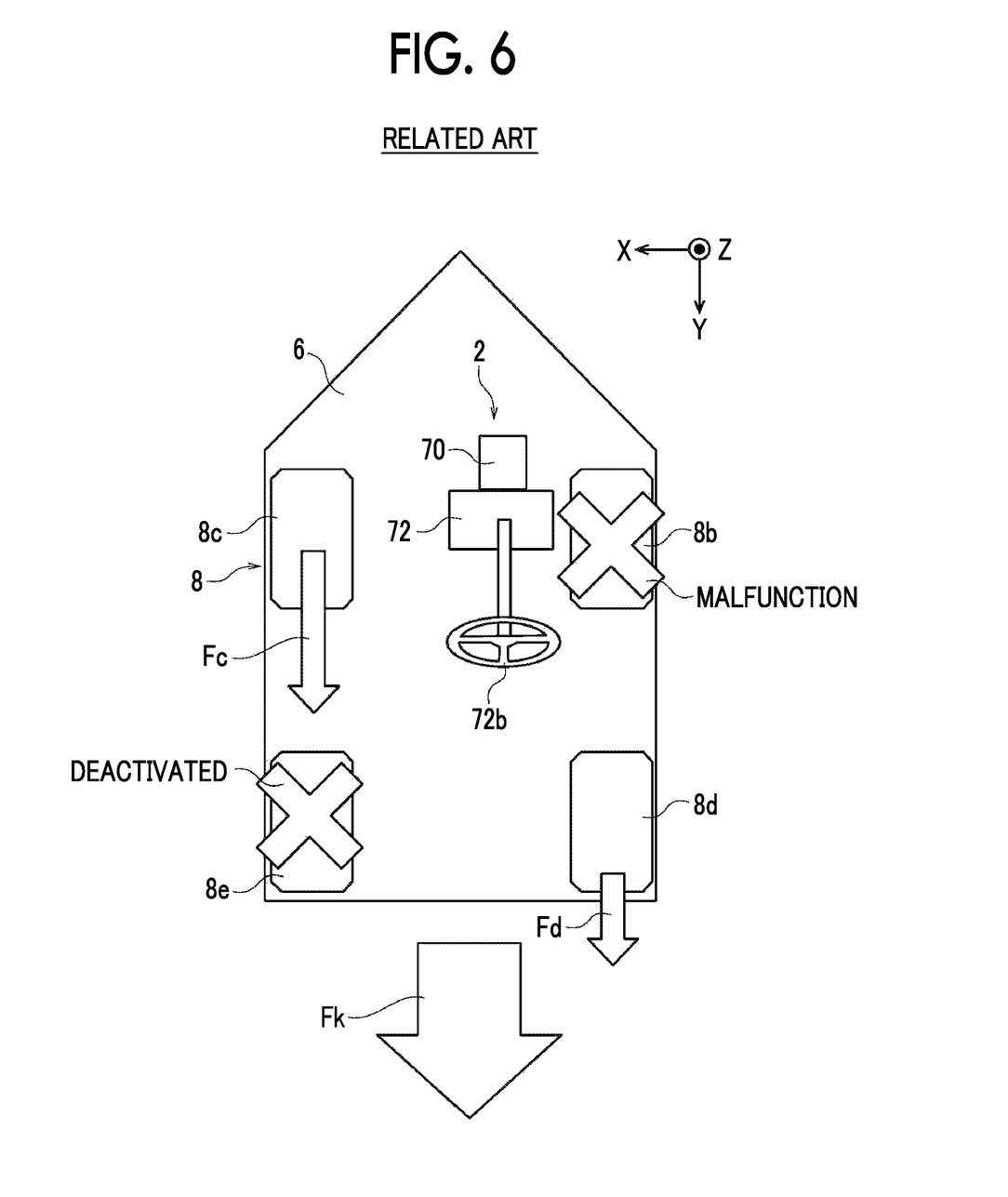
FIG. 6 is a diagram conceptually illustrating braking behavior of a vehicle including a braking device according to a second comparative example.

FIG. 6 is a diagram conceptually illustrating braking behavior of a vehicle including a braking device 2 according to a second comparative example. In the braking device 2 according to the second comparative example, operation of a normal braking force generator for a vehicle wheel, which faces a malfunctioning braking force generator, is prohibited to suppress the yawing moment. For example, in the braking device 2, when the braking force generator for the front-right wheel 8b is malfunctioning, control is performed such that operation of the braking force generator for the rear-left wheel 8e, which faces the malfunctioning braking force generator with the center of the vehicle 6 interposed therebetween, is deactivated and the braking operation continues to be performed using the braking force generators for the two other vehicle wheels 8c and 8d. In this case, it is considered that the braking force Fk for the vehicle 6 may further decrease and the braking distance may further increase. It is considered that the braking force Fk of the braking device 2 may be less than the braking force Fk of the braking device 1.

Figure 7:
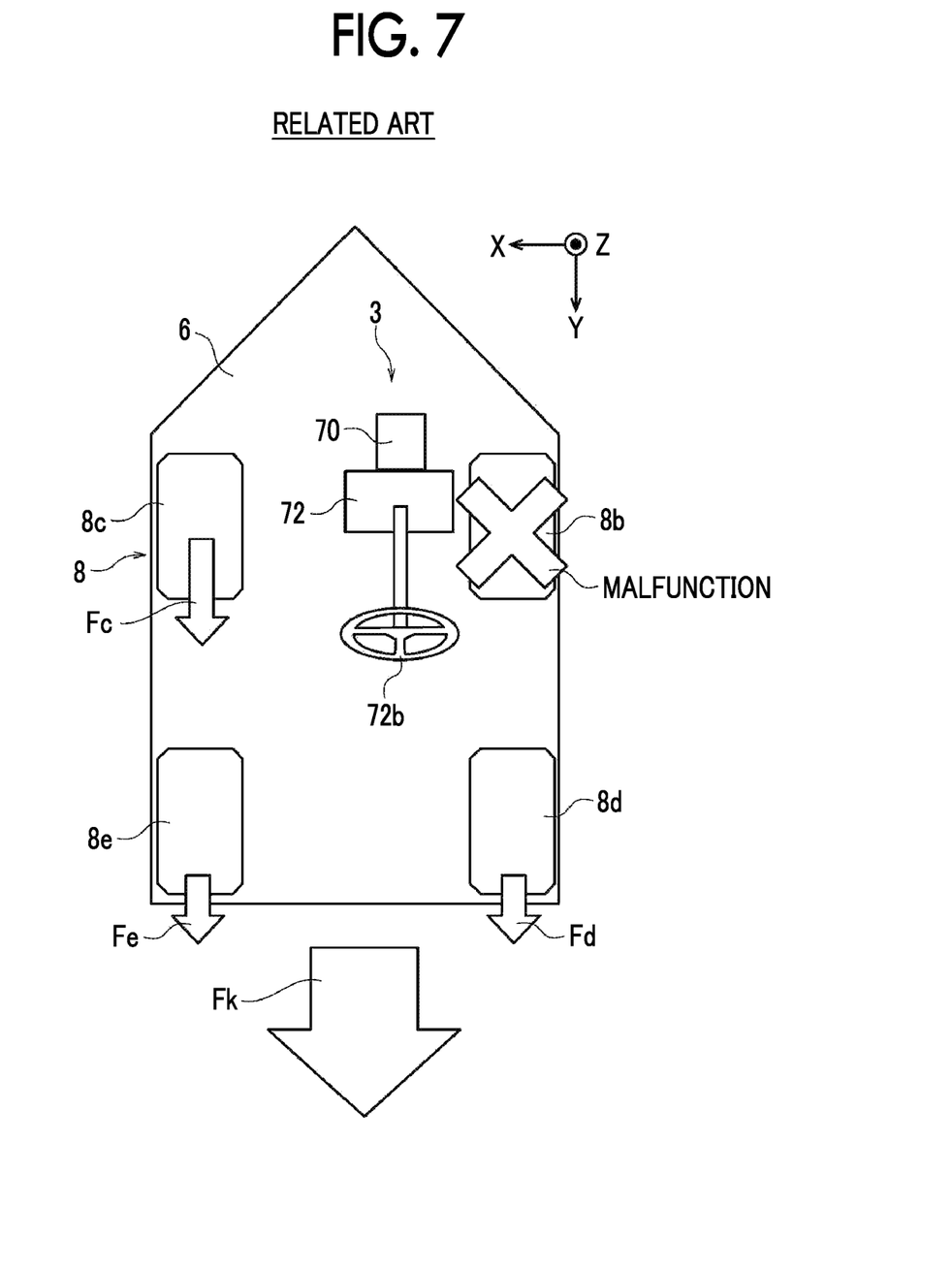
FIG. 7 is a diagram conceptually illustrating braking behavior of a vehicle including a braking device according to a third comparative example.

FIG. 7 is a diagram conceptually illustrating braking behavior of a vehicle including a braking device 3 according to a third comparative example. In the braking device 3 according to the third comparative example, the braking forces of the normal braking force generators for the three vehicle wheels 8c, 8d, and 8e are reduced and the yawing moment is reduced. For example, in the braking device 3, when the braking force generator for the front-right wheel 8b is malfunctioning, control is performed such that the braking operation continues to be performed in a state in which the braking forces Fc, Fd, and Fe of the braking force generators for the three other vehicle wheels 8c, 8d, and 8e are reduced. In this case, it is considered that the braking force Fk for the vehicle 6 may decrease and the braking distance may increase. It is considered that the braking force Fk of the braking device 3 may be less than the braking forces Fk of the braking device 1 and the braking forces Fk of the braking device 2.

The inventors obtained the following findings in the course of study of the above-mentioned comparative examples. (1) When the yaw rate of the vehicle is small, yaw rotation is not likely to occur. Accordingly, even when a braking force generator for a vehicle wheel is malfunctioning, the braking forces of the normal braking force generators for the other vehicle wheels can be increased. By increasing the braking forces of the normal braking force generators for the vehicle wheels, it is possible to increase the braking force for the entire vehicle. (2) When the yaw rate of the vehicle is large and a braking force generator for a vehicle wheel is malfunctioning, the yaw rate increases excessively and there is a high possibility that the yaw rotation of the vehicle may occur. In this case, in order to suppress an excessive increase in the yaw rate, it is effective to steer a steering wheel in a direction in which the yaw rate of the vehicle decreases. (3) That is, by changing the control depending on the magnitude of the yaw rate of the vehicle, it is possible to increase the braking force and to suppress an excessive increase in the yaw rate of the vehicle.

Figure 8:
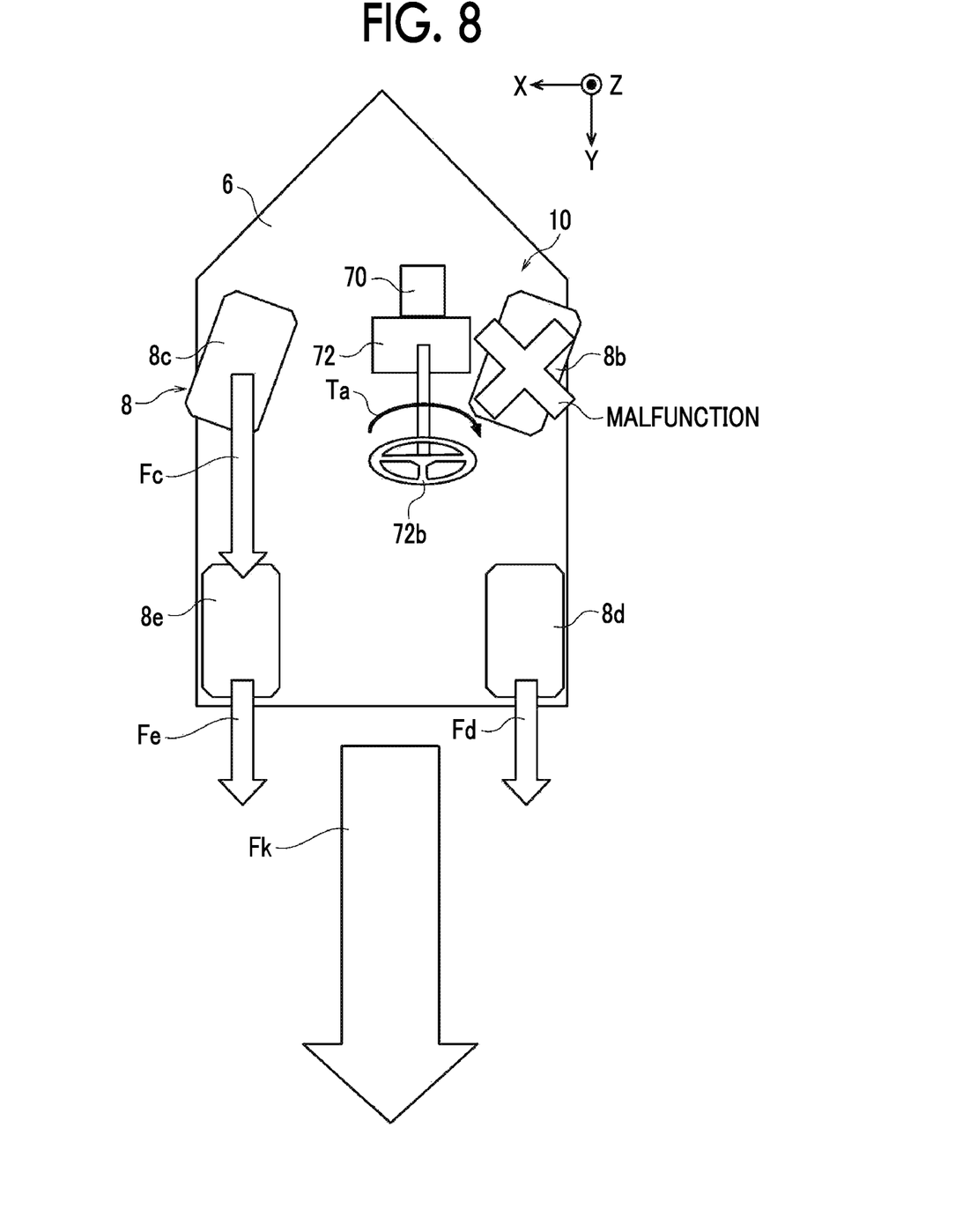
FIG. 8 is a diagram conceptually illustrating braking behavior of the vehicle including the braking device according to the embodiment.

The inventors have devised a braking device 10 according to an embodiment of the disclosure based on the above-mentioned findings. FIG. 8 is a diagram conceptually illustrating braking behavior of a vehicle 6 including the braking device 10 according to the embodiment. For example, in the case where the braking force generator for the front-right wheel 8b is malfunctioning, the braking device 10 increases the braking forces Fc, Fd, and Fe of the braking force generators for the three other vehicle wheels when the yaw rate of the vehicle is equal to or less than a reference value, and applies a torque Ta to a steering system 72 such that a steering wheel is steered in a direction in which the yaw rate of the vehicle decreases when the yaw rate of the vehicle is larger than the reference value. By employing this control, it is possible to make the braking force Fk for the vehicle 6 larger than the braking force Fk in the comparative examples and to suppress an excessive increase in the yaw rate of the vehicle. Hereinafter, a detailed configuration of the braking device 10 according to the embodiment will be described.

An example embodiment of the disclosure will be described below with reference to the accompanying drawings. In the embodiment and the modified examples, the same or corresponding elements and members will be denoted by the same reference signs and repeated description thereof will be omitted. Dimensions (sizes) of members in the drawings are appropriately enlarged or reduced for the purpose of easy understanding. Some members which are not important in describing the embodiment are not illustrated in the drawings. Although terms including ordinal numbers such as first and second are used to describe various elements, these terms are used only for the purpose of distinguishing one element from another element, and the elements are not limited by these terms.

Figure 1:
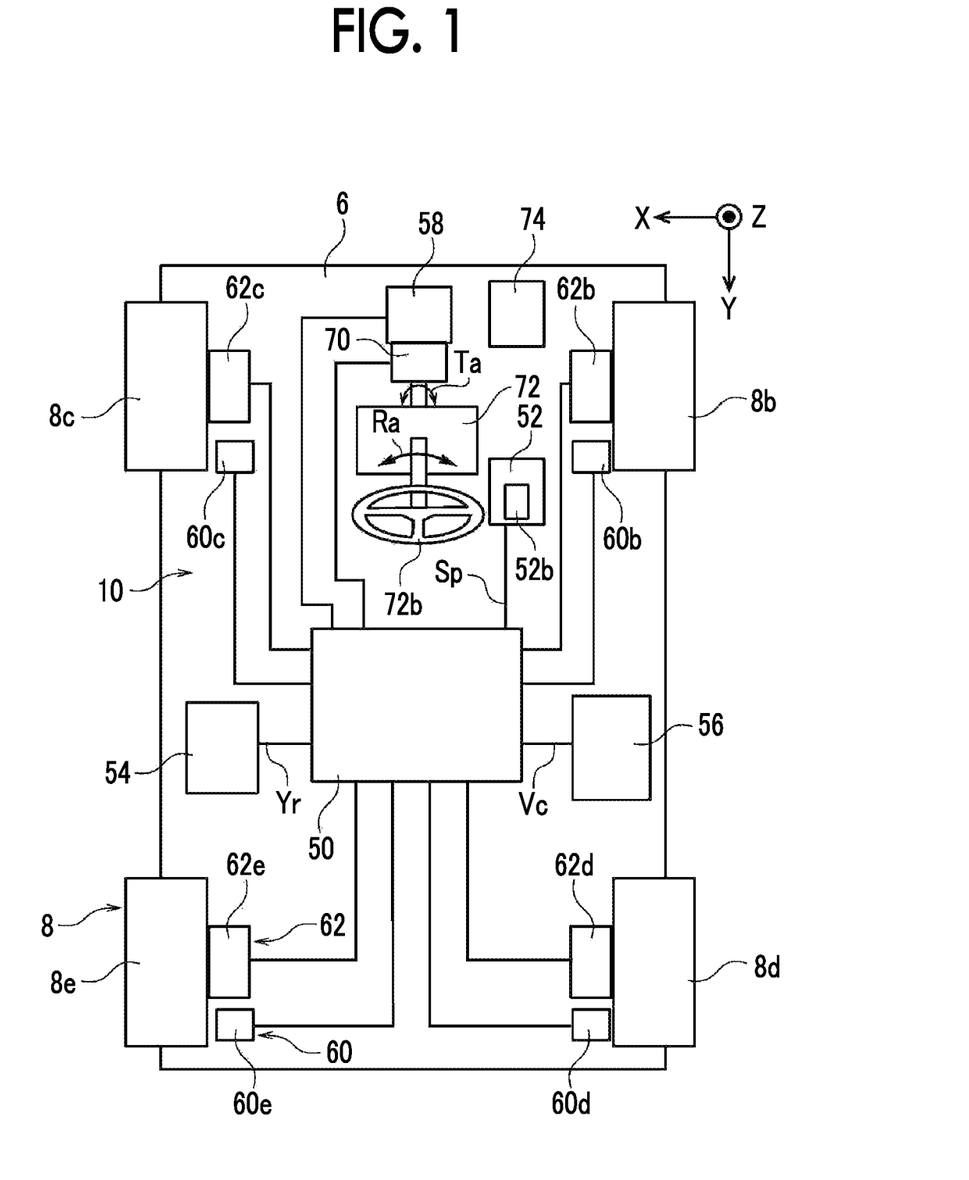
FIG. 1 is a diagram schematically illustrating a configuration of a vehicle including a braking device according to an embodiment.

FIG. 1 is a diagram schematically illustrating a configuration of a vehicle 6 including a braking device 10 according to an embodiment. The following description will be provided based on an XYZ orthogonal coordinate system. The vehicle 6 extends in the X-axis direction and the Y-axis direction in a plan view. An X-axis direction corresponds to a right-left direction in a horizontal direction, a Y-axis direction corresponds to a front-rear direction in the horizontal direction, and a Z-axis direction corresponds to an up-down direction in a vertical direction. Particularly, the X-axis direction corresponds to a width direction of the vehicle 6 and the Y-axis direction corresponds to a front-rear direction of the vehicle 6.

The vehicle 6 mainly includes vehicle wheels 8, the braking device 10, the steering system 72, and a driving system 74. The vehicle wheels 8 include four vehicle wheels 8b, 8c, 8d, and 8e. The vehicle wheel 8b is a front-right wheel, the vehicle wheel 8c is a front-left wheel, the vehicle wheel 8d is a rear-right wheel, and the vehicle wheel 8e is a rear-left wheel. The driving system 74 causes the vehicle wheels 8 to rotate and causes the vehicle 6 to move forward or rearward based on a driving force from a prime mover which is not illustrated. The steering system 72 changes directions of the front wheels 8b and 8c based on a steering angle Ra of a steering wheel 72b to control a moving direction of the vehicle 6. The braking device 10 decelerates or stops the vehicle 6.

The braking device 10 according to the embodiment includes a plurality of braking force generators 62b, 62c, 62d, and 62e that generate a braking force depending on an amount Sp of depression of a brake pedal 52b. The braking force generators 62b, 62c, 62d, and 62e will be collectively referred to as braking force generators 62. The braking force generators 62 are provided in the vicinity of the vehicle wheels 8 to respectively correspond to the vehicle wheels 8. The braking force generators 62 are controlled mutually independently.

The braking device 10 mainly includes a pedal operation detecting unit 52, a yaw rate detecting unit 54, a speed detecting unit 56, a steering angle detecting unit 58, a malfunction state detecting unit 60, a control device 50, a braking force generator 62, and a steering assist device 70.

The pedal operation detecting unit 52 detects an amount Sp of depression of the brake pedal 52b and outputs the detection result to the control device 50. The pedal operation detecting unit 52 can be configured to include, for example, a stop lamp switch (not illustrated) that detects ON/OFF of the brake pedal 52b or a stroke sensor (not illustrated) that detects a stroke of the brake pedal 52b. The yaw rate detecting unit 54 detects an actual yaw rate Yr of the vehicle 6 and outputs the detection result to the control device 50. The yaw rate detecting unit 54 can be configured to include, for example, a known yaw rate sensor (not illustrated) that detects an actual yaw rate Yr about the Z axis of the vehicle 6.

The speed detecting unit 56 detects a vehicle speed Vc of the vehicle 6 and outputs the detection result to the control device 50. The speed detecting unit 56 can be configured to include, for example, a rotation sensor (not illustrated) that outputs a signal corresponding to a rotational speed of the vehicle wheel 8. The rotation sensor may be referred to as a wheel speed sensor. The steering angle detecting unit 58 detects a steering angle Ra of the steering system 72 of the vehicle 6 and outputs the detection result to the control device 50. The steering angle detecting unit 58 can be configured to include, for example, an angle sensor (not illustrated) that outputs a signal corresponding to the steering angle Ra of the steering system 72.

The malfunction state detecting unit 60 includes malfunction state detecting units 60b, 60c, 60d, and 60e that are provided to respectively correspond to the braking force generators 62b, 62c, 62d, and 62e. Each malfunction state detecting unit 60 detects a malfunction state of the corresponding braking force generator 62 and outputs the detection result to the control device 50. The malfunction state detecting unit 60 can be configured to include, for example, an individual electronic control unit (ECU) (not illustrated) that is provided in the vicinity of the corresponding braking force generator 62 and monitors an operating state thereof. The individual ECU can detect a malfunction state based on the state of the braking force generated from the corresponding braking force generator 62. The control device 50 can obtain the detection results regarding the malfunction states from the individual ECUs. The control device 50 is configured to receive data based on the operating states, from the individual ECUs at predetermined time intervals. When the data is not received, the control device 50 can determine that the corresponding braking force generator 62 is malfunctioning. The ECU may be referred to as a CPU.

The steering assist device 70 applies the steering torque Ta to the steering system 72 of the vehicle 6 based on a control signal from the control device 50. The steering assist device 70 may be a part of a so-called power steering mechanism. The steering assist device 70 may be configured, for example, to include an electric actuator (not illustrated) that generates the steering torque Ta in accordance with the control signal from the control device 50.

Figure 3:
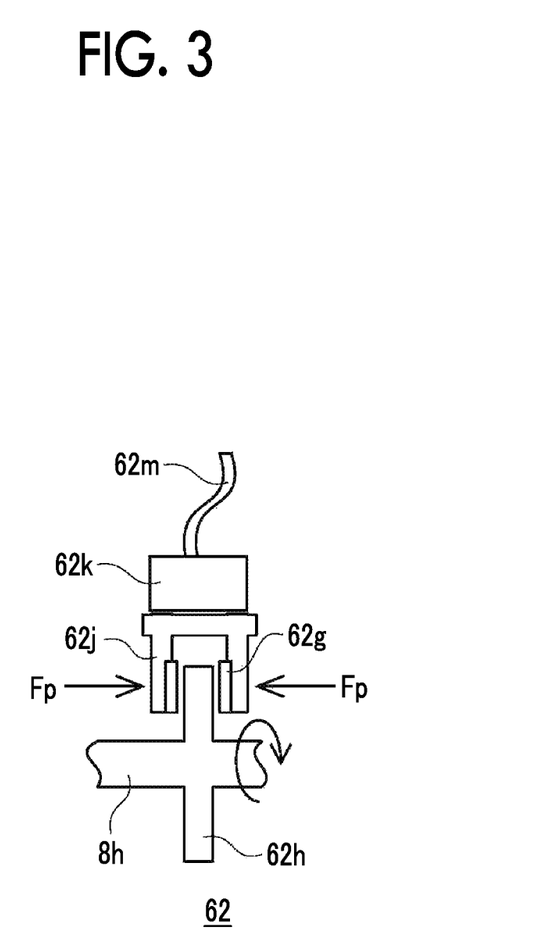
FIG. 3 is a plan view illustrating an example of a braking force generator of the braking device according to the embodiment.

The braking force generators 62 include the four braking force generators 62b, 62c, 62d, and 62e which are provided to respectively correspond to the vehicle wheels 8. The braking force generator 62 may be, for example, an electrical braking device. Braking mechanisms based on various principles can be used for the braking force generator 62. FIG. 3 is a plan view illustrating an example of the braking force generator 62. For example, in the embodiment, the braking force generator 62 includes a caliper 62j that is driven by an electric actuator 62k and a disc rotor 62h that is interposed between brake pads 62g assembled into the caliper 62j. The disc rotor 62h rotates integrally with the vehicle wheel 8 via an axle 8h. The actuator 62k is connected to the control device 50 and a power source which is not illustrated via a cable 62m. The actuator 62k changes a pressing force Fp of the brake pads 62g between which the disc rotor 62h is interposed, in accordance with a control signal from the control device 50. With this configuration, the braking force generator 62 can generate the braking force in accordance with the control signal from the control device 50.

The braking force generator 62*b* is provided to correspond to the vehicle wheel 8*b* which is the front-right wheel and brakes the vehicle wheel 8*b* based on the control signal from the control device 50. The braking force generator 62*c* is provided to correspond to the vehicle wheel 8*c* which is the front-left wheel and brakes the vehicle wheel 8*c* based on the control signal from the control device 50. The braking force generator 62*d* is provided to correspond to the vehicle wheel 8*d* which is the rear-right wheel and brakes the vehicle wheel 8*d* based on the control signal from the control device 50. The braking force generator 62*e* is provided to correspond to the vehicle wheel 8*e* which is the rear-left wheel and brakes the vehicle wheel 8*e* based on the control signal from the control device 50.

Figure 2:
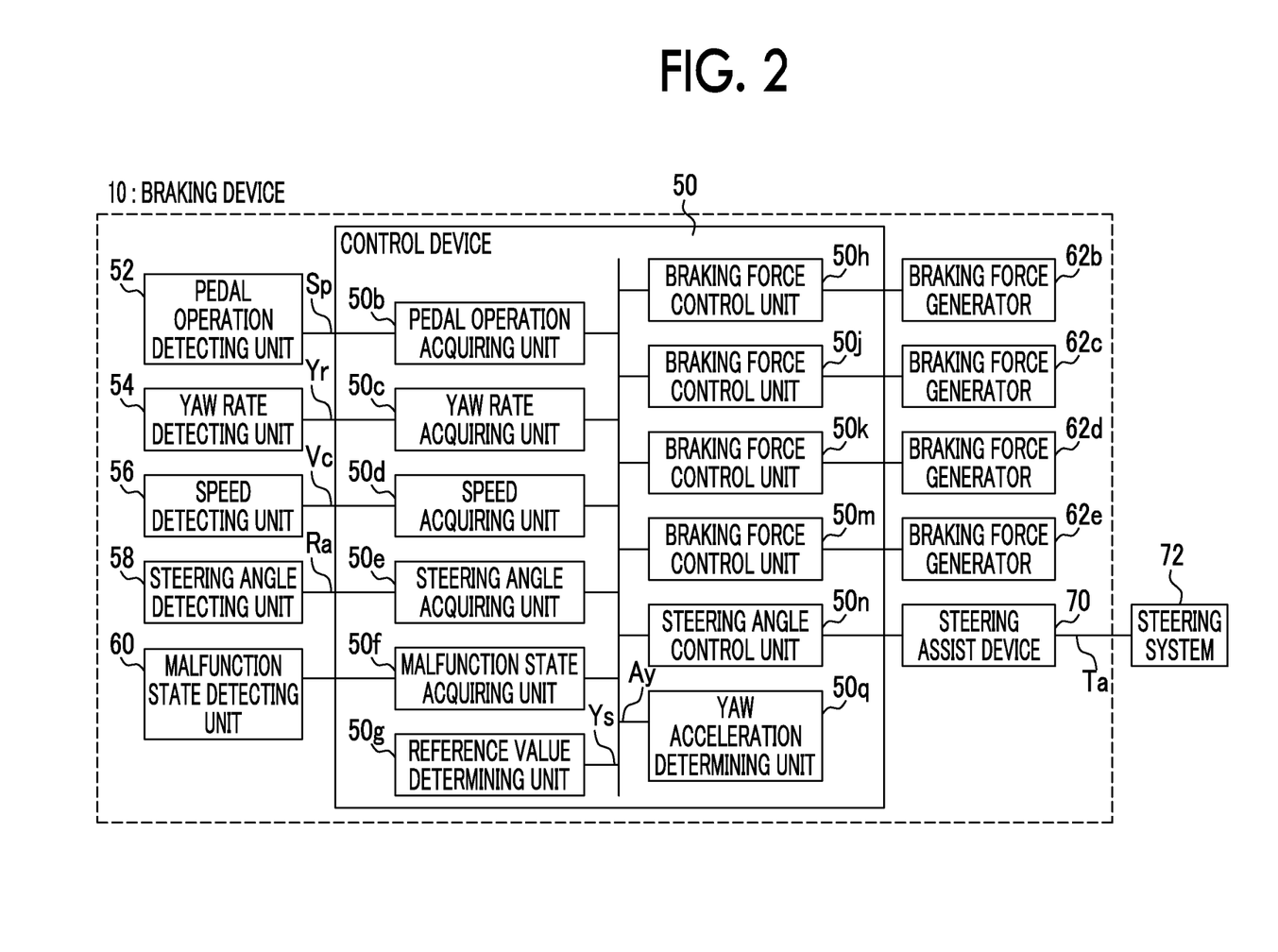
FIG. 2 is a block diagram illustrating the braking device according to the embodiment.

The control device 50 will be described below. FIG. 2 is a block diagram illustrating the braking device 10 according to the embodiment. Each block of the control device 50 illustrated in FIG. 2 can be implemented by an element or a mechanical device such as a central processing unit (CPU) of a computer in hardware, and can be implemented by a computer program or the like in software. FIG. 2 shows functional blocks which are implemented by combining hardware and software. Accordingly, it is to be understood by persons skilled in the art that the functional blocks can be implemented in various forms in combination of hardware and software.

The control device 50 includes a pedal operation acquiring unit 50*b*, a yaw rate acquiring unit 50*c*, a speed acquiring unit 50*d*, a steering angle acquiring unit 50*e*, a malfunction state acquiring unit 50*f*, a reference value determining unit 50*g*, braking force control units 50*h*, 50*j*, 50*k*, and 50*m*, a steering angle control unit 50*n*, and a yaw acceleration determining unit 50*q*. The pedal operation acquiring unit 50*b* acquires a detected amount Sp of depression of the brake pedal 52*b* from the pedal operation detecting unit 52. The yaw rate acquiring unit 50*c* acquires an actual yaw rate Yr of the vehicle 6. For example, in the embodiment, the yaw rate acquiring unit 50*c* acquires a detected actual yaw rate Yr of the vehicle 6 from the yaw rate detecting unit 54.

The speed acquiring unit 50*d* acquires a detected vehicle speed Vc of the vehicle 6 from the speed detecting unit 56. The steering angle acquiring unit 50*e* acquires a detected steering angle Ra of the steering system 72 of the vehicle 6 from the steering angle detecting unit 58. The malfunction state acquiring unit 50*f* acquires a detected malfunction state from the malfunction state detecting unit 60.

The reference value determining unit 50*g* determines and stores a reference value Ys for a yaw rate. In the reference value determining unit 50*g*, the reference value Ys may be determined in advance and be given as an initial value. In this case, the reference value Ys for a yaw rate can be determined by simulation based on desired braking characteristics, and static parameters such as a stability factor, a steering gear ratio, and a wheelbase of the vehicle 6.

In the reference value determining unit 50*g*, the reference value Ys may be determined after the control device 50 starts its operation. When dynamic parameters such as the vehicle speed Vc of the vehicle 6 and the steering angle Ra of the steering system 72 are large, the yaw rotation of the vehicle 6 is more likely to occur than when the dynamic parameters are small. Accordingly, the control device 50 may determine the reference value Ys based on the static parameters, the vehicle speed Vc, and the steering angle Ra. For example, the reference value determining unit 50*g* can determine the reference value Ys based on at least one of the vehicle speed Vc of the vehicle 6 and the steering angle Ra. For example, in the embodiment, the reference value determining unit 50*g* determines the reference value Ys for a yaw rate based on the acquired vehicle speed Vc of the vehicle 6 and the acquired steering angle Ra of the steering system 72.

The reference value Ys corresponding to the vehicle speed Vc and the steering angle Ra can be determined by simulation based on the static parameters and the desired braking characteristics. For example, the control device 50 can store information in which the reference value Ys corresponding to the vehicle speed Vc and the steering angle Ra is set. The control device 50 can store the information in a form of a table. By referring to the table, the control device 50 can determine the reference value Ys based on the vehicle speed Vc and the steering angle Ra.

The braking force control unit 50*h* controls the braking force generator 62*b* such that the braking force for the front-right wheel 8*b* increases or decreases. The braking force control unit 50*j* controls the braking force generator 62*c* such that the braking force for the front-left wheel 8*c* increases or decreases. The braking force control unit 50*k* controls the braking force generator 62*d* such that the braking force for the rear-right wheel 8*d* increases or decreases. The braking force control unit 50*m* controls the braking force generator 62*e* such that the braking force for the rear-left wheel 8*e* increases or decreases.

The steering angle control unit 50*n* controls the steering assist device 70 such that the steering torque Ta applied to the steering system 72 of the vehicle 6 increases or decreases. The yaw acceleration determining unit 50*q* determines a yaw acceleration Ay. For example, in the embodiment, the yaw acceleration determining unit 50*q* determines the yaw acceleration Ay based on a rate of change in the actual yaw rate Yr acquired by the yaw rate acquiring unit 50*c*. For example, a detection mechanism that detects a yaw acceleration may be separately provided and the yaw acceleration Ay may be acquired from the detection mechanism.

Figure 4:
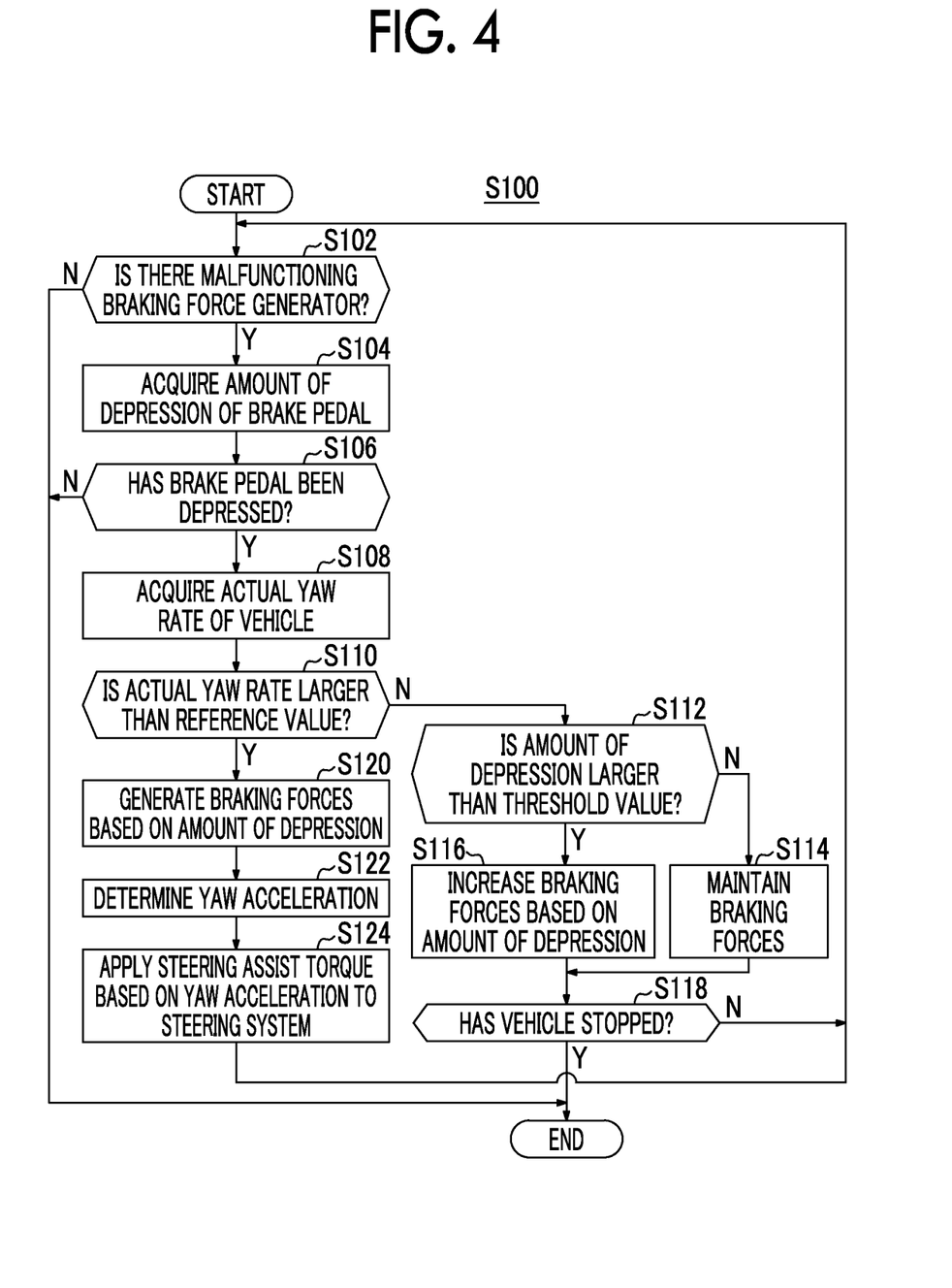
FIG. 4 is a flowchart illustrating an example of braking force control for the braking device according to the embodiment.

An example of the operation of the braking device 10 for a vehicle having the above-mentioned configuration will be described below. FIG. 4 is a flowchart illustrating an example of the operation of the braking device 10. This flowchart illustrates a process routine S100 of controlling the braking device 10 when there is a malfunctioning braking force generator 62. When the process routine S100 starts, the control device 50 acquires the detection results regarding the malfunction states of the braking force generators 62 from the malfunction state detecting unit 60 and determines whether there is a malfunctioning braking force generator among the braking force generators 62 (Step S102). When none of the braking force generators 62 is malfunctioning (N in Step S102), the control device 50 ends the process routine S100.

When there is a malfunctioning braking force generator 62 (Y in Step S102), the control device 50 acquires the detected amount Sp of depression of the brake pedal 52*b* from the pedal operation detecting unit 52 (Step S104). After the control device 50 acquires the amount Sp of depression of the brake pedal 52*b*, the control device 50 determines whether the brake pedal 52*b* has been depressed (Step S106). When the control device 50 has determined that the brake pedal 52*b* has not been depressed (N in Step S106), the control device 50 ends the process routine S100.

When the control device 50 determines that the brake pedal 52*b* has been depressed (Y in Step S106), the control device 50 acquires the detected actual yaw rate Yr of the vehicle 6 from the yaw rate detecting unit 54 (Step S108). After the control device 50 acquires the actual yaw rate Yr, the control device 50 determines whether the actual yaw rate Yr is larger than the reference value Ys (Step S110). When the actual yaw rate Yr is not larger than the reference value Ys, that is, when the actual yaw rate Yr is equal to or less than the reference value Ys (N in Step S110), the control device 50 causes the process routine to proceed to Step S112.

When the value of the actual yaw rate Yr acquired from the yaw rate detecting unit is equal to or less than the reference value Ys, the control device 50 performs control such that the braking forces of the braking force generators 62 other than the malfunctioning braking force generator are maintained or increased in Steps S112 to S116. In Step S112, the control device 50 determines whether the amount Sp of depression acquired in Step S104 is larger than a threshold value St in this step (Step S112). When the amount Sp of depression is not larger than the threshold value St (N in Step S112), the control device 50 performs control such that the braking forces of the braking force generators 62 other than the malfunctioning braking force generator are maintained (Step S114). The threshold value St may be set by simulation based on desired braking characteristics.

When the amount Sp of depression is larger than the threshold value St (Y in Step S112), the control device 50 increases the braking forces of the braking force generators 62 other than the malfunctioning braking force generator based on the amount of depression (Step S116). In Step S116, the control device 50 performs control such that an increase amount of the braking forces of the braking force generators 62 (i.e., an increase amount by which the braking forces of the braking force generators 62 are increased) becomes larger as the amount Sp of depression becomes larger. In other words, the control device 50 performs control such that the braking forces of the braking force generators 62 increase by a larger amount as the amount Sp of depression becomes larger.

The relationship between the amount Sp of depression and the increase amount of the braking forces in Step S116 may be determined by simulation based on desired braking characteristics. For example, the control device 50 can store the relationship between the amount Sp of depression and the increase amount of the braking forces, the relationship being determined by simulation. The control device 50 can store the relationship in a form of a table. In Step S116, the control device 50 can determine the increase amount of the braking forces based on the amount Sp of depression by referring to the table.

After the control device 50 performs Step S114 or Step S116, the control device 50 determines whether the vehicle 6 has stopped (Step S118). When the vehicle 6 has not stopped (N in Step S118), the control device 50 returns the process routine to step S102 and repeatedly performs the loop. When the vehicle 6 has stopped (Y in Step S118), the control device 50 ends the process routine S100.

When the actual yaw rate Yr is larger than the reference value Ys (Y in Step S110), the control device 50 causes the process routine to proceed to Step S120. When the acquired value of the actual yaw rate Yr is larger than the reference value Ys, the control device 50 performs control such that the steering torque Ta is applied to the steering system 72 in a direction in which the actual yaw rate Yr of the vehicle 6 decreases in Steps S120 to S124. Steps S120 to S124 are a so-called cooperative steering control process of controlling steering in accordance with the control of a braking force. In Step S120, the control device 50 causes the braking force generators 62 other than the malfunctioning braking force generator to generate the braking forces based on the amount Sp of depression (Step S120). The relationship between the amount Sp of depression and the braking forces may be the same as the relationship at the time of normal traveling.

The control device 50 may perform control such that the steering torque Ta increases as the yaw acceleration Ay increases when the acquired value of the actual yaw rate Yr is larger than the reference value Ys. In this case, after the control device 50 performs Step S120, the control device 50 determines the yaw acceleration Ay (Step S122). As described above for the yaw acceleration determining unit 50q, in the embodiment, the control device 50 determines the yaw acceleration Ay based on the rate of change in the acquired actual yaw rate Yr. After the control device 50 determines the yaw acceleration Ay, the control device 50 applies the steering torque Ta based on the determined yaw acceleration Ay to the steering system 72 (Step S124).

The relationship between the yaw acceleration Ay and the steering torque Ta in Step S124 can be determined by simulation based on desired braking characteristics. For example, the control device 50 can store the relationship between the yaw acceleration Ay and the steering torque Ta, the relationship being determined by simulation. The control device 50 can store the relationship in a form of a table. In Step S124, the control device 50 can determine the steering torque Ta based on the yaw acceleration Ay by referring to the table.

After the control device 50 performs Step S124, the control device 50 returns the process routine to step S102 and repeats the loop. The process routine S100 is only an example and another process may be added to the process routine, a step may be deleted or modified, or the order of steps may be changed.

Operations and advantageous effects of the braking device 10 for the vehicle according to the embodiment having the above-mentioned configuration will be described below.

The braking device 10 according to the embodiment includes the plurality of braking force generators 62 provided to respectively correspond to the vehicle wheels 8 of the vehicle 6, and configured to be controlled mutually independently and to generate the braking forces based on the amount Sp of depression of the brake pedal 52b; the steering assist device 70 configured to apply the steering torque Ta to the steering system 72 of the vehicle 6; the yaw rate detecting unit 54 configured to detect the actual yaw rate Yr of the vehicle 6; and the control device 50 configured to control the steering assist device 70 and the plurality of braking force generators 62. The control device 50 is configured to perform control such that, in a case where the plurality of braking force generators 62 perform the braking operation and there is a malfunctioning braking force generator 62 that does not generate the braking force among the plurality of braking force generators 62, the braking forces of the plurality of braking force generators 62 other than the malfunctioning braking force generator 62 are maintained or increased when the acquired value of the actual yaw rate Yr acquired from the yaw rate detecting unit 54 is equal to or less than the reference value Ys, and the steering torque Ta is applied to the steering system 72 in the direction in which the actual yaw rate Yr of the vehicle 6 decreases when the acquired value of the actual yaw rate Yr is larger than the reference value Ys. With this configuration, when the actual yaw rate Yr is larger than the reference value Ys, the steering torque is applied in the direction in which the actual yaw rate Yr decreases and thus it is possible to improve traveling stability. When the actual yaw rate Yr is equal to or less than the reference value Ys, the braking forces of the non-malfunctioning braking force generators 62 can be increased. As a result, it is possible to achieve traveling stability and to provide a sufficient braking force.

The braking device 10 according to the embodiment may further include at least one of a unit configured to determine the vehicle speed Vc of the vehicle 6 and a unit configured to determine the steering angle Ra of the steering system 72, and the control device 50 may determine the reference value Ys based on at least one of the determined vehicle speed Vc and the determined steering angle Ra. With this configuration, since the reference value Ys can be dynamically determined based on at least one of the vehicle speed Vc and the steering angle Ra, it is possible to further improve the traveling stability.

In the braking device 10 according to the embodiment, the control device 50 may increase the braking forces of the plurality of braking force generators 62 other than the malfunctioning braking force generator 62 by a larger amount as the amount Sp of depression becomes larger when the acquired value of the actual yaw rate Yr is equal to or less than the reference value Ys. With this configuration, since the braking forces can be increased by a larger amount as the amount Sp of depression becomes larger, it is possible to provide a larger braking force.

The braking device 10 according to the embodiment may further include the yaw acceleration determining unit 50q which is a unit configured to determine the yaw acceleration Ay of the vehicle 6, and the control device 50 may increase the steering torque Ta as the yaw acceleration Ay increases when the acquired value of the actual yaw rate Yr is larger than the reference value Ys. With this configuration, since the steering torque Ta can be increased as the yaw acceleration Ay increases, it is possible to further improve the traveling stability.

The embodiment of the disclosure has been described above. The embodiment is merely an example and it is to be understood by persons skilled in the art that various changes and modifications may be made to the above-described embodiment within the scope of the disclosure. Accordingly, description of the specification and the drawings should not be regarded as restrictive, and should be regarded as illustrative.

Modified examples of the disclosure will be described below. In drawings and description of the modified examples, the same or corresponding elements and members as in the embodiment will be denoted by the same reference signs. The same description as in the embodiment will be appropriately omitted and a configuration different from the embodiment will be mainly described.

A first modified example will be described. In the embodiment, the process in the case of N in Step S102 (i.e., the process in the case where a negative determination is made in Step S102) is performed when it is determined in Step S106 that the brake pedal 52b has not been depressed. However, the disclosure is not limited to this control. For example, when the brake pedal 52b is slightly depressed and the amount Sp of depression is equal to or less than a predetermined amount, the control device 50 may perform the process in the case of N in Step S102.

A second modified example will be described. In the embodiment, the control device 50 causes the process routine to proceed to Step S112 when it is determined in Step S110 that the actual yaw rate Yr is equal to or less than the reference value Ys (N in Step S110). However, the disclosure is not limited to this control. For example, Step S112 may be deleted and the process routine may proceed directly to Steps S116 to S118. Alternatively, Step S112 may be deleted and the process routine may proceed directly to Steps S114 to S118.

According to the above-mentioned modified examples, it is possible to obtain the same advantageous effects as in the embodiment.

What is claimed is:

1. A braking device for a vehicle, comprising:
   a plurality of braking force generators, the plurality of braking force generators respectively corresponding to wheels of the vehicle, and configured to be controlled independent of each other, and to generate braking forces based on an amount of depression of a brake pedal;
   a steering assist device configured to apply a steering torque to a steering system of the vehicle;
   a yaw rate detecting unit configured to detect an actual yaw rate of the vehicle; and
   a control device configured to control the steering assist device and the plurality of braking force generators, wherein
   in a case where (1) the plurality of braking force generators perform a braking operation, (2) a braking force generator of the plurality of braking force generators malfunctions by not generating a braking force common among the other braking force generators of the plurality of braking force generators, (3) an acquired value of the actual yaw rate acquired from the yaw rate detecting unit is equal to or less than a predetermined reference value, and (4) the amount of depression of the brake pedal is larger than a threshold value, the control device is configured to increase the braking forces of the plurality of braking force generators other than the malfunctioning braking force generator, and
   in a case where (1) the plurality of braking force generators perform the braking operation, (2) a braking force generator of the plurality of braking force generators malfunctions by not generating the braking force common among the other braking force generators of the plurality of braking force generators, and (3) the acquired value of the actual yaw rate is larger than the predetermined reference value, the control device is configured to apply the steering torque to the steering system in a direction in which the actual yaw rate decreases.

2. The braking device according to claim 1, wherein the control device is configured to increase the braking forces of the plurality of braking force generators other than the malfunctioning braking force generator by a larger amount as the amount of depression of the brake pedal becomes larger, when the acquired value of the actual yaw rate is equal to or less than the predetermined reference value.

3. The braking device according to claim 1, further comprising a unit configured to determine a yaw acceleration of the vehicle, wherein the control device is further configured to increase the steering torque as the yaw acceleration increases, when the acquired value of the actual yaw rate is larger than the predetermined reference value.

4. The braking device according to claim 1, further comprising at least one of a unit configured to determine a vehicle speed of the vehicle and a unit configured to determine a steering angle of the steering system, wherein the control device is further configured to predetermine the reference value based on at least one of the determined vehicle speed and the determined steering angle.

5. A vehicle comprising
   a braking device, wherein the braking device includes:
- a plurality of braking force generators, the plurality of braking force generators respectively corresponding to wheels of the vehicle, and configured to be controlled independent of each other, and to generate braking forces based on an amount of depression of a brake pedal;
- a steering assist device configured to apply a steering torque to a steering system of the vehicle;
- a yaw rate detecting unit configured to detect an actual yaw rate of the vehicle; and
- a control device configured to control the steering assist device and the plurality of braking force generators, wherein in a case where (1) the plurality of braking force generators perform a braking operation, (2) a braking force generator of the plurality of braking force generators malfunctions by not generating a braking force common among the other braking force generators of the plurality of braking force generators, (3) an acquired value of the actual yaw rate acquired from the yaw rate detecting unit is equal to or less than a predetermined reference value, and (4) the amount of depression of the brake pedal is larger than a threshold value, the control device is configured to increase the braking forces of the plurality of braking force generators other than the malfunctioning braking force generator, and in a case where (1) the plurality of braking force generators perform the braking operation, (2) a braking force generator of the plurality of braking force generators malfunctions by not generating the braking force common among the other braking force generators of the plurality of braking force generators, and (3) the acquired value of the actual yaw rate is larger than the predetermined reference value, the control device is configured to apply the steering torque to the steering system in a direction in which the actual yaw rate decreases.

6. The vehicle according to claim 5, wherein the braking device further includes at least one of a unit configured to determine a vehicle speed of the vehicle and a unit configured to determine a steering angle of the steering system, wherein the control device is further configured to predetermine the reference value based on at least one of the determined vehicle speed and the determined steering angle.

* * * * *